(12) United States Patent
Sakuma et al.

(10) Patent No.: US 6,824,198 B2
(45) Date of Patent: Nov. 30, 2004

(54) VEHICLE DOOR IMPACT BEAM

(75) Inventors: Katsuji Sakuma, Nagoya (JP); Joichi Bansho, Himi (JP); Shinji Makino, Toyama-ken (JP)

(73) Assignees: Aisin Seiki Kabushiki Kaisha, Kariya (JP); Aisin Keikinzoku Kabushiki Kaisha, Shinminato (JP)

( * ) Notice: Subject to any disclaimer, the term of this patent is extended or adjusted under 35 U.S.C. 154(b) by 56 days.

(21) Appl. No.: 10/346,080

(22) Filed: Jan. 17, 2003

(65) Prior Publication Data
US 2003/0132643 A1 Jul. 17, 2003

(30) Foreign Application Priority Data

Jan. 17, 2002 (JP) ........................................ 2002-008203

(51) Int. Cl.[7] ................................................ B60J 5/00
(52) U.S. Cl. ................. 296/146.6; 296/187.12
(58) Field of Search ..................... 296/146.6, 187.12; 52/735.1

(56) References Cited

U.S. PATENT DOCUMENTS

| 4,684,166 A | 8/1987 | Kanodia | |
|---|---|---|---|
| 5,221,377 A | * 6/1993 | Hunt, Jr. et al. | 148/417 |
| 5,452,545 A | * 9/1995 | Siekmeyer et al. | 49/502 |
| 5,527,082 A | * 6/1996 | Topker et al. | 296/146.6 |

FOREIGN PATENT DOCUMENTS

| EP | 0 235 091 B2 | | 5/1995 | |
|---|---|---|---|---|
| GB | 2280456 | * | 2/1995 | 296/146.6 |
| JP | 0208225 | * | 8/1989 | 296/146.6 |
| JP | 5-330450 A | | 12/1993 | |
| JP | 406048177 | * | 2/1994 | 296/146.6 |
| JP | 3103337 B2 | | 8/2000 | |

* cited by examiner

Primary Examiner—Dennis H. Pedder
(74) Attorney, Agent, or Firm—Burns, Doane, Swecker & Mathis, L.L.P.

(57) ABSTRACT

A door impact beam for a vehicle which includes a flange for receiving a load, a reinforcement body having approximately U shape in cross section and provided in one piece with the flange, a pair of separated side portions for connecting the reinforcement body to the flange, a bottom portion connected to the side portions via each curved portion, and the side portions having a configuration extended in an outward width direction while extended to the bottom portion direction.

19 Claims, 4 Drawing Sheets

VEHICLE DOOR IMPACT BEAM

This application is based on and claims priority under 35 U.S.C. §119 with respect to Japanese Patent Application 2002-008203 filed on Jan. 17, 2002, the entire content of which is incorporated herein by reference.

FIELD OF THE INVENTION

The present invention relates to a door impact beam. More particularly, the present invention pertains to a door impact beam, that is, a reinforcement member provided in a vehicle door for ensuring a security of occupants against a side collision of the vehicle.

BACKGROUND OF THE INVENTION

A door impact beam (i.e., door reinforcement member) is provided in a vehicle door in order to ensure a safety of occupants upon the side collision of the vehicle. For fulfillment demands to improve fuel efficiency by minimizing the weight of the vehicle, the door impact beam is made of aluminum alloy, particularly, the door impact beam is made of an extruded member of the 7000 series aluminum alloy (i.e., Al—Zn—Mg series) whose principle ingredients are 0.2–2.5 percent of magnesium and 4.5–6.0 percent of zinc. The percentage of the proportion of the metal composition is represented as mass percent.

FIG. 5 shows a cross sectional view of a known door impact beam. A vehicle door impact beam 1 includes plate shaped flanges 2, 3, on top and bottom of FIG. 5 and a pair of webs 4, 5 for connecting the flanges 2, 3. Flange width W corresponds to 30–50 mm, a width from an external surface of the web 4 to an external surface of the web 5 corresponds to 15–25 mm, a plate thickness of flanges 2, 3, and webs 4, 5, corresponds to 2–3.5 mm, and a height from an external surface of the flange 2 to an external surface of the flange 3 corresponds to less than 32 mm.

Both ends of the door impact beam are supported by the door structure. When a load generated by the side collision is applied on the flanges 2, 3, the door impact beam bends. During the bending process, the cross-sectional form of the impact beam is maintained. Thus, the compression stress affects on the first flange to which the load is applied and the tensile stress affects on the second flange opposing to the first flange. By experiments and theoretical analysis, it is proven that a fracture of the impact beam occurs, when the tensile stress affecting on the second flange exceeds the critical stress, and absorbed amount of impact energy by the door impact beam is limited.

In order to improve an impact energy absorption characteristics, Japanese Patent Laid-Open Publication No. 5-330450 discloses a door impact beam configuration including a pair of separately disposed webs having different plate thickness each other. The door impact beam thus formed with unsymmetrical webs absorbs the side impact energy efficiently, because of large bending deformation, when the impact load is applied on the flange surface in rather exact perpendicular direction as expected by design. In this case, the webs are deformed to reduce the cross-sectional height and the increase of the tensile stress on the second flange is eased not to exceed the critical stress during the bending process. However, for the impact load in different from the expected direction by the design which makes the cross-section collapse, and the thin web is easily fractured, and falls to exert enough impact energy absorption function.

Japanese Patent publication No. 3103337 discloses a door impact beam which has bores on a flange and a web, in order to sift a neutral axis position (i.e., a balancing position of the tensile and compression stress) of section modulus of the door impact beam. The neutral axis position is shifted towards a direction of a flange to make the tensile stress reduced on the flange. Though the tensile stress is eased and the increased bend is permitted in this manner, the reduced section modulus by the bores renders the impact beam to be weakened for loads in directions deviated from the designed direction, also providing the bores on the flange and web boosts manufacturing cost.

A need thus exists for a door impact beam which prevents the fracture of the door impact beam while maintaining the larger section modulus.

SUMMARY OF THE INVENTION

In light of the foregoing, a door impact beam for a vehicle comprises a flange for receiving a load, a reinforcement body having a cross section providing with a pair of side portions connected with the flange and a bottom portion connected with the side portions via each curved portion, and the side portions being inclined in an outward direction to increase a width of each other while extending from the flange to the bottom portion.

According to another aspect of the present invention, a door impact beam for a vehicle comprises, a flange for receiving a load, a reinforcement body having a cross section providing with a pair of side portions connected with the flange and a bottom portion connected with the side portions via each curved portion, the side portions being inclined in an outward direction to increase a width of each other while extending from the flange to the bottom portion, and a neutral axis of a cross section modulus of the door impact beam being positioned approximately on a center of a height between the flange and the bottom portion.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
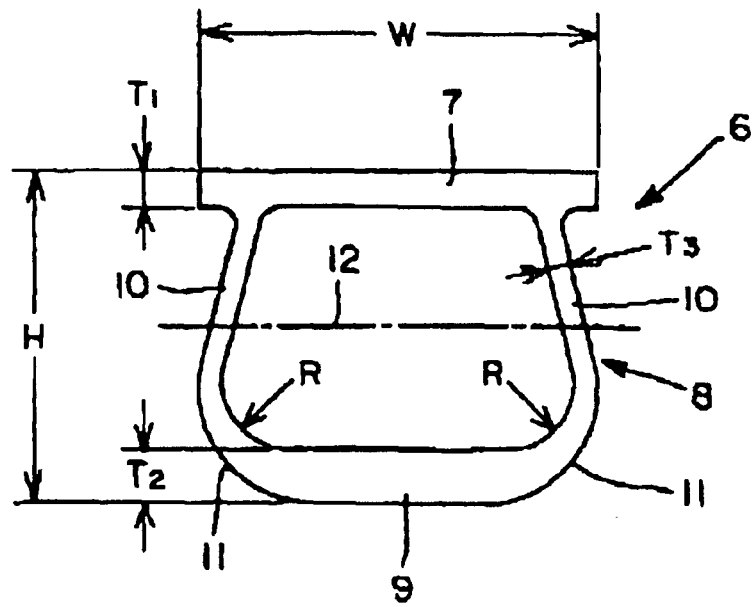
FIG. 1 is a cross-sectional view of a door impact beam according to an embodiment of the present invention.

FIG. 1 shows a cross-sectional configuration of a door impact beam 6 according to an embodiment of the present invention. The door impact beam 6 is made of a long extruded member (i.e., having the length of approximately 1200 mm) of an aluminum alloy. The door impact beam 6 includes a plate flange 7 on a top of FIG. 1 and a U-shaped reinforcement body 8 in one unit. The reinforcement body 8 includes a bottom portion 9 which is opposing to the flange 7 and thicker than the flange 7, and the side portions 10, 10 integrally connected to the flange 7 and inclined in an outward direction to increase a width of each other while extending from the flange to the bottom portion. The reinforcement body 8 also includes curved portions 11, 11 for connecting the bottom portion 9 and the side portions 10, 10. A neutral axis 12 of sectional modulus of the door impact beam 6 is determined approximately in a center (i.e., ½ of H) of a height H, at which a section modulus is maximized. When the neutral axis is in the center, the section modulus is maximized and thus the approximately the same strength against the deformation of both the flange 7 and the bottom portion 9 is ensured.

A width W of the flange 7 is determined to be approximately same with a maximum distance between external side surfaces of the side portions 10, 10. A thickness T2 of the bottom portion 9 is determined as multiplied by 1.2–1.6 of a thickness T1 of the flange 7. A radius R of the curved portions 11, 11 is determined to be 6–10 mm. A thickness T3 of the side portions 10, 10 is determined to be as multiplied by 0.4–0.8 of the thickness T1 of the flange 7.

The aluminum alloy for the door impact beam 6 includes 1–2 percent of magnesium and 7–9 percent of zinc inclusion of equal to or less than 1 percent of magnesium and equal to or less than 7 percent of zinc causes the deficit of the strength of the impact beam. The inclusion of equal to or greater than 2 percent of magnesium and equal to or greater than 9 percent of zinc is not preferable in terms of the extrusion characteristics, the toughness, and the corrosion resistance of the impact beam. More preferably, the aluminum alloy of the impact beam 6 includes 1–1.5 percent of magnesium and 7–7.8 percent of zinc.

The aluminum alloy further includes 0.1–0.4 percent of copper. Adding small amount of copper is effective for ensuring the strength necessary for the impact beam and for improving the corrosion resistance. More preferably, the aluminum alloy of the door impact beam 6 includes 0.15–0.3 percent of copper.

Aluminum alloy is added with 0.05–0.3 percent of manganese, 0.05–0.3 percent of chromium, and 0.05–0.25 percent of zirconium. Addition of the transition element miniaturizes crystal grains of the alloy and avoid the recrystallization of the aluminum alloy, and thus is effective for preventing the fracture of the impact beam when the load is applied. More preferably, the aluminum alloy of the door impact beam 6 includes 0.05–0.20 percent of manganese, 0.05–0.15 percent of chromium, and 0.10–0.20 percent of zirconium. The rest of the alloy for the door impact beam is composed with aluminum and the unavoidable impurity.

Figure 4:
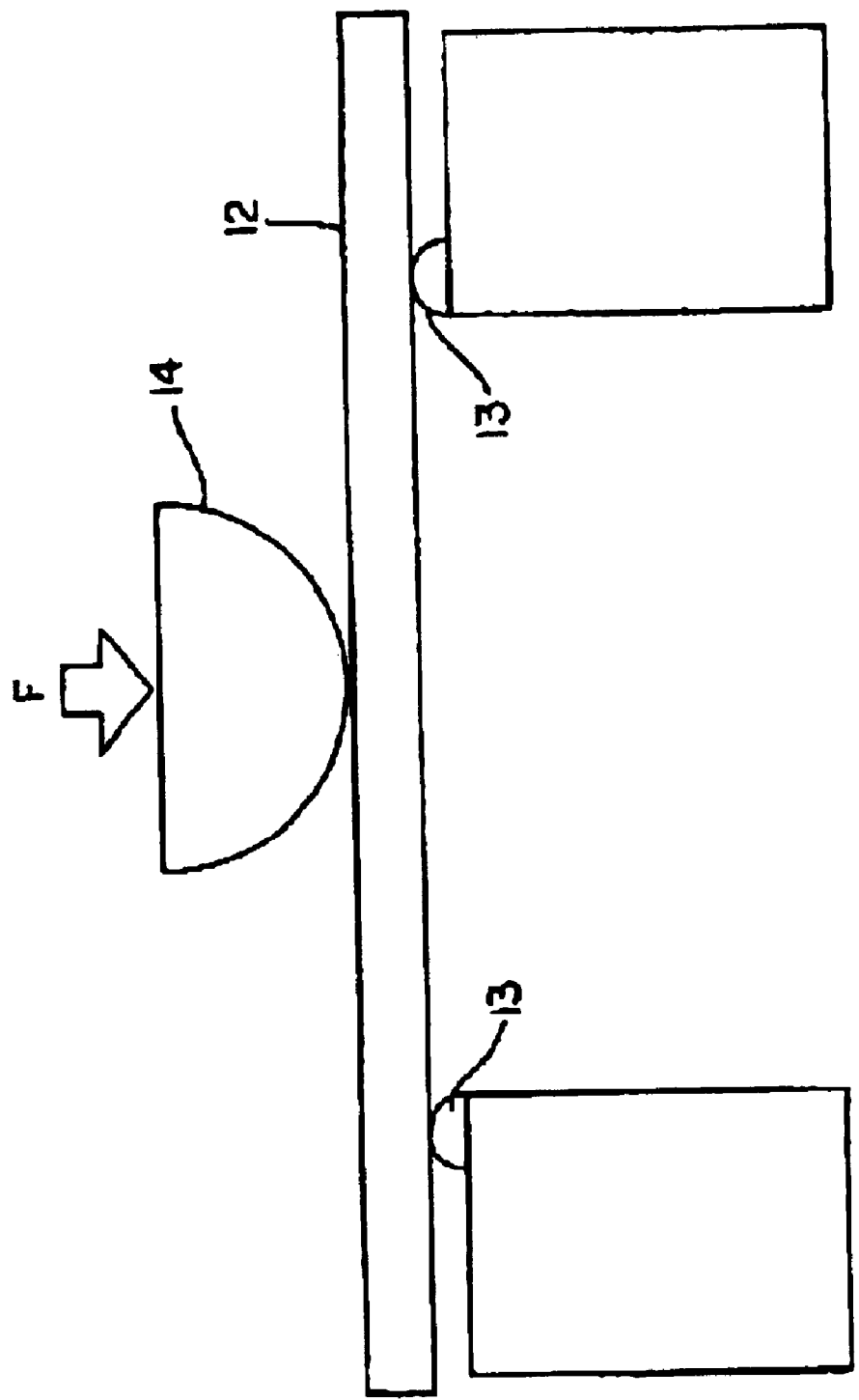
FIG. 4 is a front view showing a test device of a door impact beam.

A comparison between the embodiment and a comparative example is performed by a loading experiment. As shown in FIG. 4, a test device supports both ends of a test object 12 (i.e., having the length of 1200 mm) by jigs 13, 13 which are separated by 840 mm each other. A load F is applied on a top center of the test object 12 via a predetermined test tool 14. The predetermined test tool 14 has a hemispherical configuration having radius of 300 mm. The composition (i.e., shown with percentage) of the aluminum alloy for the door impact beam of the embodiment is as follows: 1.20 percent of magnesium; 7.50 percent of zinc; 0.20 percent of copper; 0.10 percent of manganese; 0.05 percent of chromium; 0.15 percent of zirconium; 0.06 percent of silicon; 0.15 percent of iron; and the Aluminum and unavoidable impurity. 7N01 alloy of 7000 series (Al—Zn—Mg system) is applied as the aluminum alloy for the comparative example.

Figure 5:
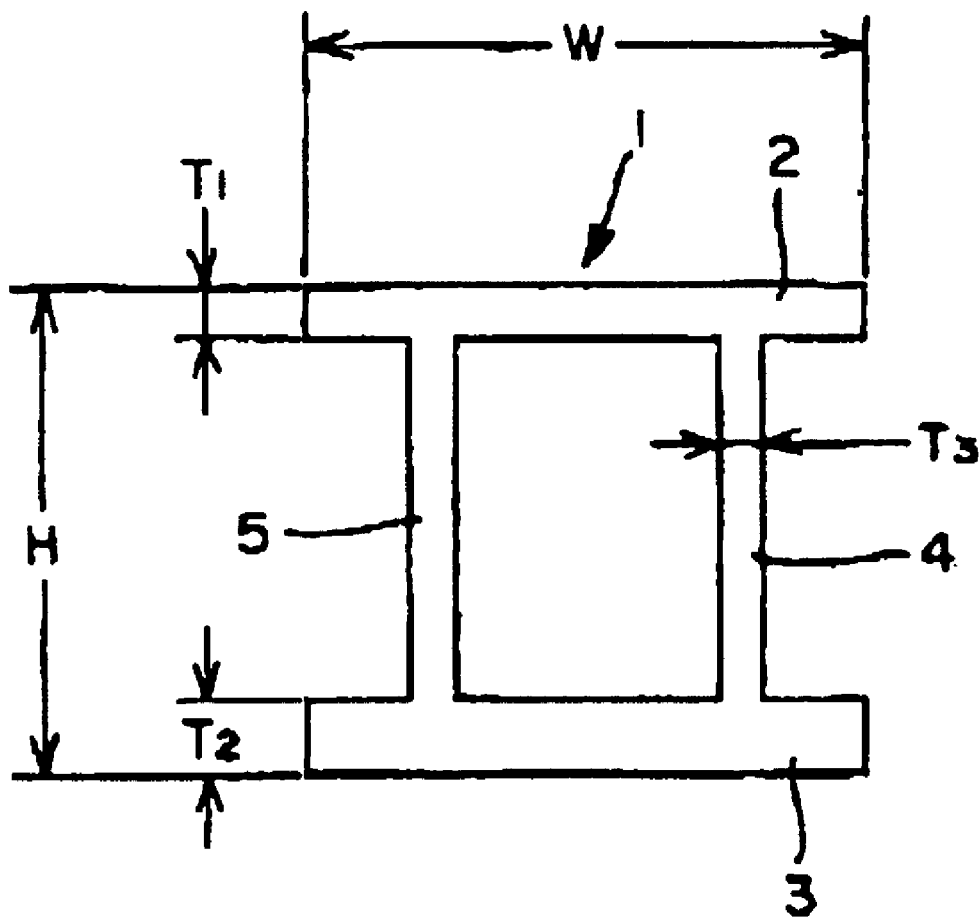
FIG. 5 is a cross-sectional view of a known door impact beam.

FIG. 1 and FIG. 5 show the cross-sectional configuration of the embodiment and the comparative example. A table 1 shows the size (mm) of the door impact beam of the embodiment and the comparative example. Radius R of FIG. 1 according to the embodiment is determined to be 8 mm. Radius R of wall portions connecting the web and the flange is determined to be 6 mm. The length between the webs of the comparative example is determined to be 25 mm.

|  | H | W | T1 | T2 | T3 |
|---|---|---|---|---|---|
| Embodiment | 32 | 45 | 3.2 | 4.6 | 2 |
| Comparative example | 32 | 45 | 3.2 | 4.6 | 2.6 |

Figure 3:
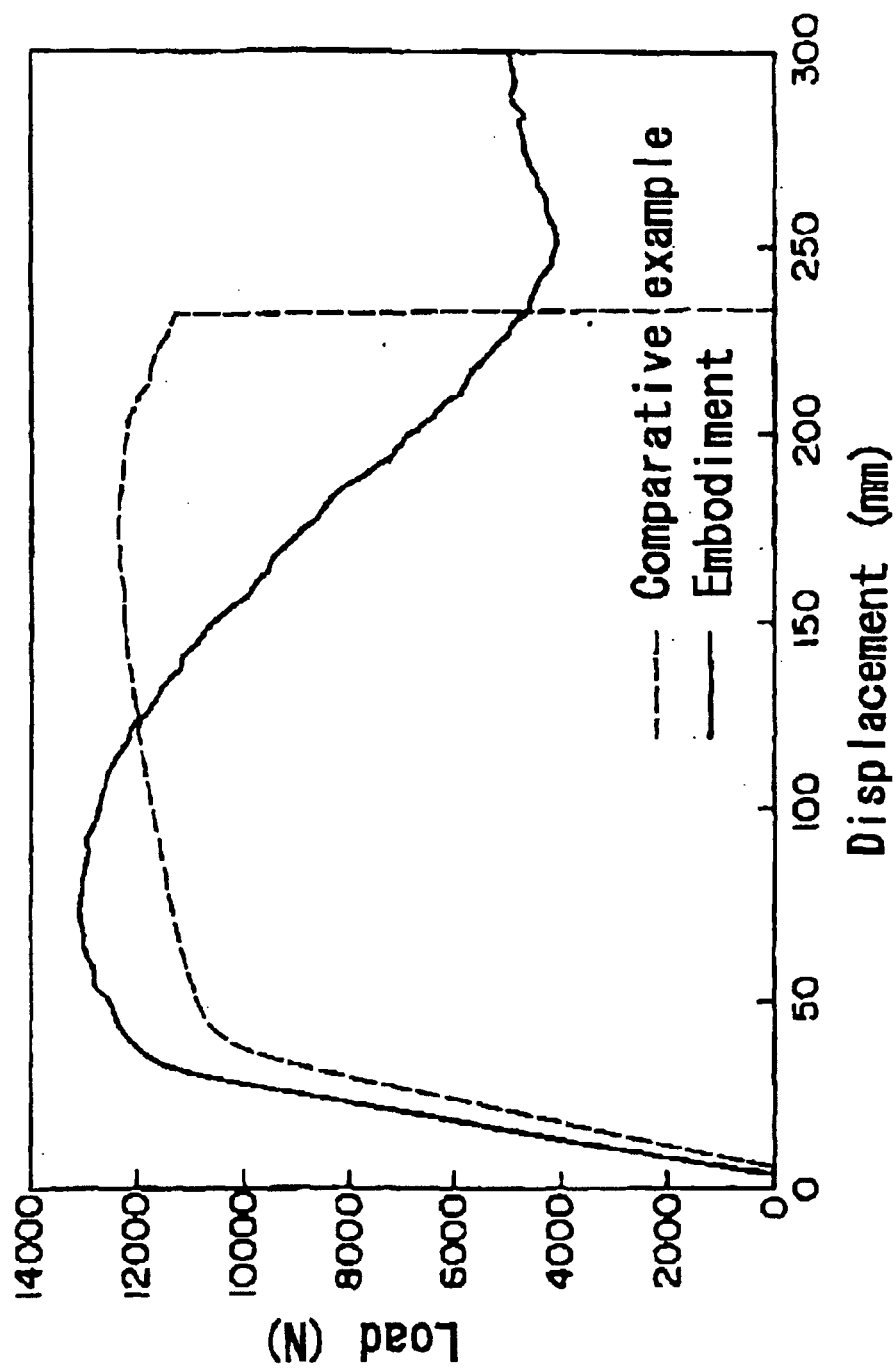
FIG. 3 is a graph showing a relationship between a load and a displacement.

As shown in FIG. 3, when varying the load from 2000N to 14000N, the door impact beam of the comparative example is fractured at around 230 mm displacement of the test tool 14, while showing the broad plastic deformation range of the load from 10000N to 12000N and the displacement from 40 to 230 mm. The door impact beam of the embodiment shows the broad elastic range having around 40 mm displacement under the load of approximate 12000N, then shows a wide plastic range while decreasing the load from the approximately 100 mm displacement, which shows large amount of the energy absorption.

Figure 2:
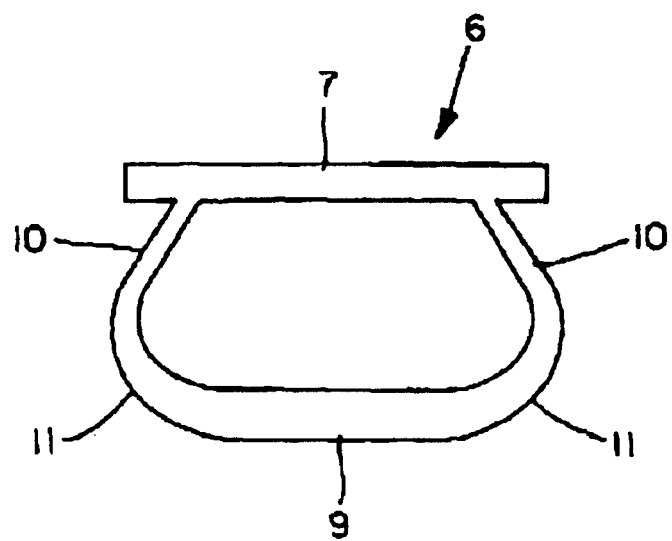
FIG. 2 is a cross-sectional view showing the door impact beam deformed according to the embodiment of the present invention.

FIG. 2 shows a cross-sectional of the door impact beam 6 being plastically deformed. The tensile stress of the bottom portion 9 is increased along with the application of the load and the increase of the tensile stress expands the curved portion 11 in outward directions. This mitigates the tensile stress of the bottom portion 9 and prevents the fracture. As shown in FIG. 2, because the pair of the side portions 10, 10 are inclined outwardly in the width direction from the flange 7 to the bottom portion 9, angles formed between the flange 7 and the side portions 10, 10, is increased by the effect of the load and the flange 7 gets access to the bottom portion 9. The foregoing displacement is influenced by the angle of the side portions 10, 10 and the radius R of the curved portions 11, 11. It is preferable to determine the radius R of the curved portions 11, 11, to be 6–10 mm.

With the embodiment of the present invention, by providing with the configuration having the side portions 10, 10 whose width is widened from the top to downward, the deformation of the side portions 10, 10 to the outward direction becomes easy and thus the cross-sectional secondary moment and the section modulus about the neutral axis 12 can be increased. This maintains the desirable strength and rigidity of the door impact beam 6. The both ends of the bottom portion 9 may be extended greater than the width of the side portions 10, 10.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A door impact beam for a vehicle comprising:

a flange for receiving a load;

a reinforcement body having a cross section providing with a pair of side portions connected with the flange and a bottom portion connected with each side portion via a curved portion;

the side portions having a radius of curvature of 6 mm–10 mm;

the flange having a width approximately the same as a maximum width between the pair of side portions; and the side portions being inclined in an outward direction to increase a width between the side portions while extending from flange to the bottom portion.

2. A door impact beam for a vehicle according to claim 1, wherein the bottom portion has a thickness greater than a thickness of the flange and the flange has a thickness greater than the side portion.

3. A door impact beam for a vehicle according to claim 1, wherein the door impact bean is made from an aluminum alloy including 1–2 mass percent of magnesium and 7–9 mass percent of zinc.

4. A door impact beam for a vehicle according to claim 1, wherein the door impact beam is made from an aluminum alloy including compositions of 1–2 mass percent of magnesium, 7–9 mass percent of zinc, 0.1–0.4 mass percent of copper, 0.05–3 mass percent of manganese, 0.05–0.3 mass percent of chromium, 0.05–25 mass percent of zirconium, aluminum, and unavoidable impurity.

5. A door impact beam for a vehicle according to claim 1, wherein the door impact beam is made from an aluminum alloy which includes composition of 1–1.5 mass percent of magnesium, 7–7.8 mass percent of zinc, 0.15–0.3 mass percent of copper, 0.05–0.20 mass percent of manganese, 0.05–0.15 mass percent of chromium, 0.10–0.20 mass percent of zirconium, aluminum, and unavoidable impurity.

6. A door impact beam for a vehicle according to claim 1, wherein the door impact beam is made from an aluminum alloy which includes 1–2 mass percent of magnesium, 7–9 mass percent of zinc, and a transition element.

7. A door impact beam for a vehicle comprising:

a flange for receiving a load;

a reinforcement body having a cross section providing with a pair of side portions connected with the flange and a bottom portion connected with each side portion via a curved portion;

the side portions being inclined in an outward direction to increase a width between the side portions while extending from flange to the bottom portion;

the side portions having a radius of curvature of 6 mm–10 mm;

the flange having a width substantially the same as a maximum width between the pair of side portions; and a neutral axis of a cross section modulus of the door impact beam being positioned approximately in a center of a height between the flange and the bottom portion.

8. A door impact beam according to claim 7, wherein the bottom portion includes a thickness greater than a thickness of the flange and the flange includes a thickness greater than the side portion.

9. A door impact beam for a vehicle according to claim 7, wherein the door impact beam is made from an aluminum alloy including 1–2 mass percent of magnesium and 7–9 mass percent of zinc.

10. A door impact beam for a vehicle according to claim 7, wherein the door impact beam is made from an aluminum alloy which includes compositions of 1–2 mass percent of magnesium, 7–9 mass percent of zinc, 0.1–4 mass percent of copper, 0.05–0.3 mass percent of manganese, 0.05–0.3 mass percent of chromium, 0.05–0.25 mass percent of zirconium aluminum, and unavoidable impurity.

11. A door impact beam for a vehicle according to claim 7, wherein the door impact beam is made from an aluminum alloy which includes composition of 1–1.5 mass percent of manganese, 7–7.8 mass percent of zinc, 0.15–0.3 mass percent of copper, 0.05–0.20 mass percent of manganese, 0.05–0.15 mass percent of chromium, 0.10–0.20 mass percent of zirconium, aluminum, and unavoidable impurity.

12. A door impact beam for a vehicle according to claim 7, wherein the door impact beam is made from an aluminum alloy including 1–2 mass percent of magnesium, 7–9 mass percent of zinc, and a transition element.

13. A door impact beam for a vehicle comprising:

flange for receiving a load;

a reinforcement body whose cross-section comprises a pair of side portions connected to the flange and to a bottom portion, each of the side portions being connected to the bottom portion by way of a curved portion, each curved portion having an inner surface facing interior of the cross-section, the inner surface of each curved portion being curved and possessing a radius of curvature of at least 6 mm; and the side portions being inclined in an outward direction so that a distance between the side portions increases in a direction toward the bottom portion.

14. A door impact beam for a vehicle according to claim 13, wherein the bottom portion has a thickness greater tan a thickness of the flange, and the thickness of the flange is greater than a thickness of the side portions.

15. A door impact beam for a vehicle according to claim 13, wherein the flange has a width that is approximately the same as a maximum width between the pair of side portions.

16. A door impact beam for a vehicle according to claim 13, wherein the door impact beam is made from an aluminum alloy including 1–2 mass percent of magnesium and 7–9 mass percent of zinc.

17. A door impact beam for a vehicle according to claim 13, wherein the door impact bean is made from an aluminum alloy which includes compositions of 1–2 mass percent of mangnesium, 7–9 mass percent of zinc, 0.1–0.4 mass percent of copper, 0.05–0.3 mass percent of manganese, 0.05–0.3 mass percent of chromium, 0.05–0.25 mass percent of zirconium, aluminum, and unavoidable impurity.

18. A door impact beam for a vehicle according to claim 13, wherein the door impact beam is made from an aluminum alloy having a composition of 1–1.5 mass percent of magnesium, 7–7.8 mass percent of zinc, 5–0.3 mass percent of copper, 0.05–0.20 mass percent of manganese, 0.05–0.15 mass percent of chromium, 0.10–0.20 mass percent of zirconium, aluminum, and unavoidable impurity.

19. A door impact beam for a vehicle according to claim 13, wherein the door impact beam is made from an aluminum alloy including 1–2 mass percent of magnesium, 7–9 mass percent of zinc, and a transition element.

* * * * *